Feb. 24, 1925.
T. CAMP
DEVICE FOR APPLYING POISON
Filed Dec. 10, 1923
1,527,669
2 Sheets-Sheet 2
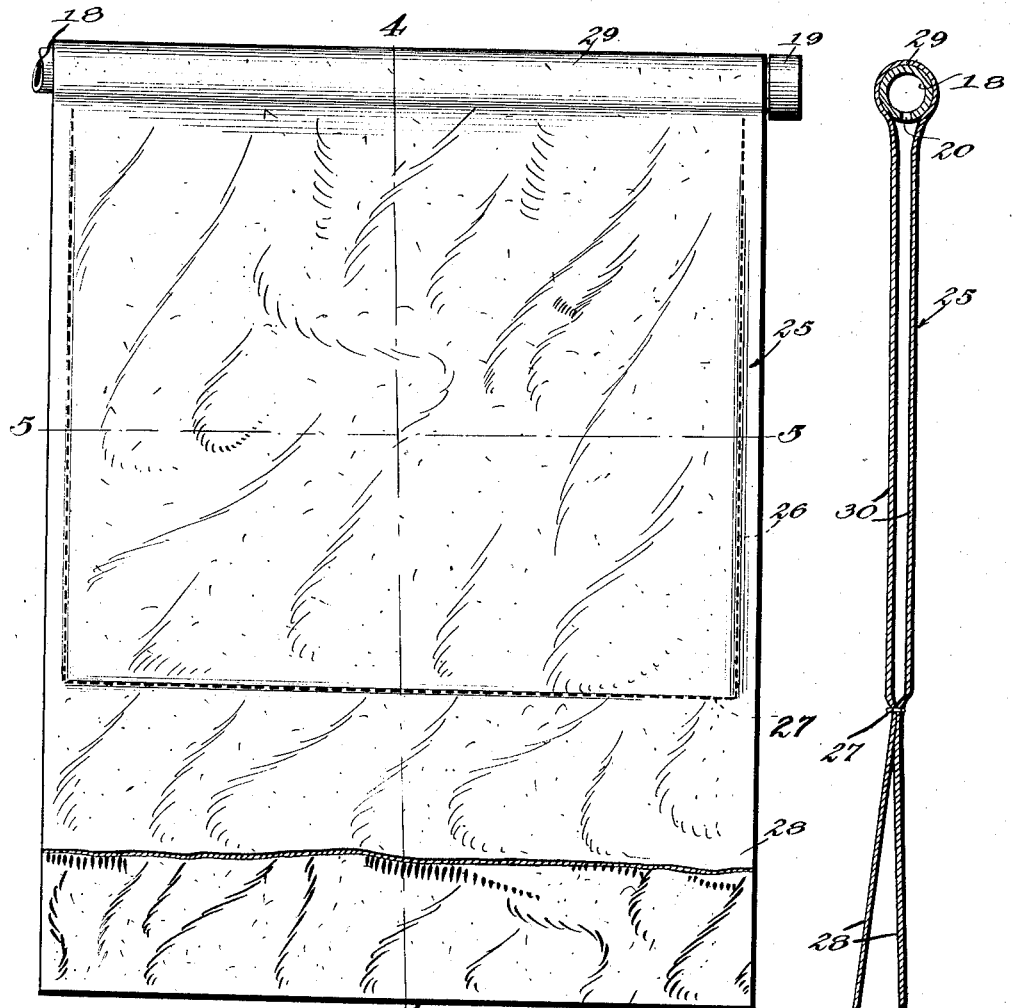
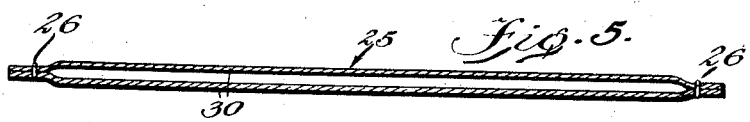
WITNESSES
INVENTOR
Thomas Camp,
BY
ATTORNEYS Patented Feb. 24, 1925.

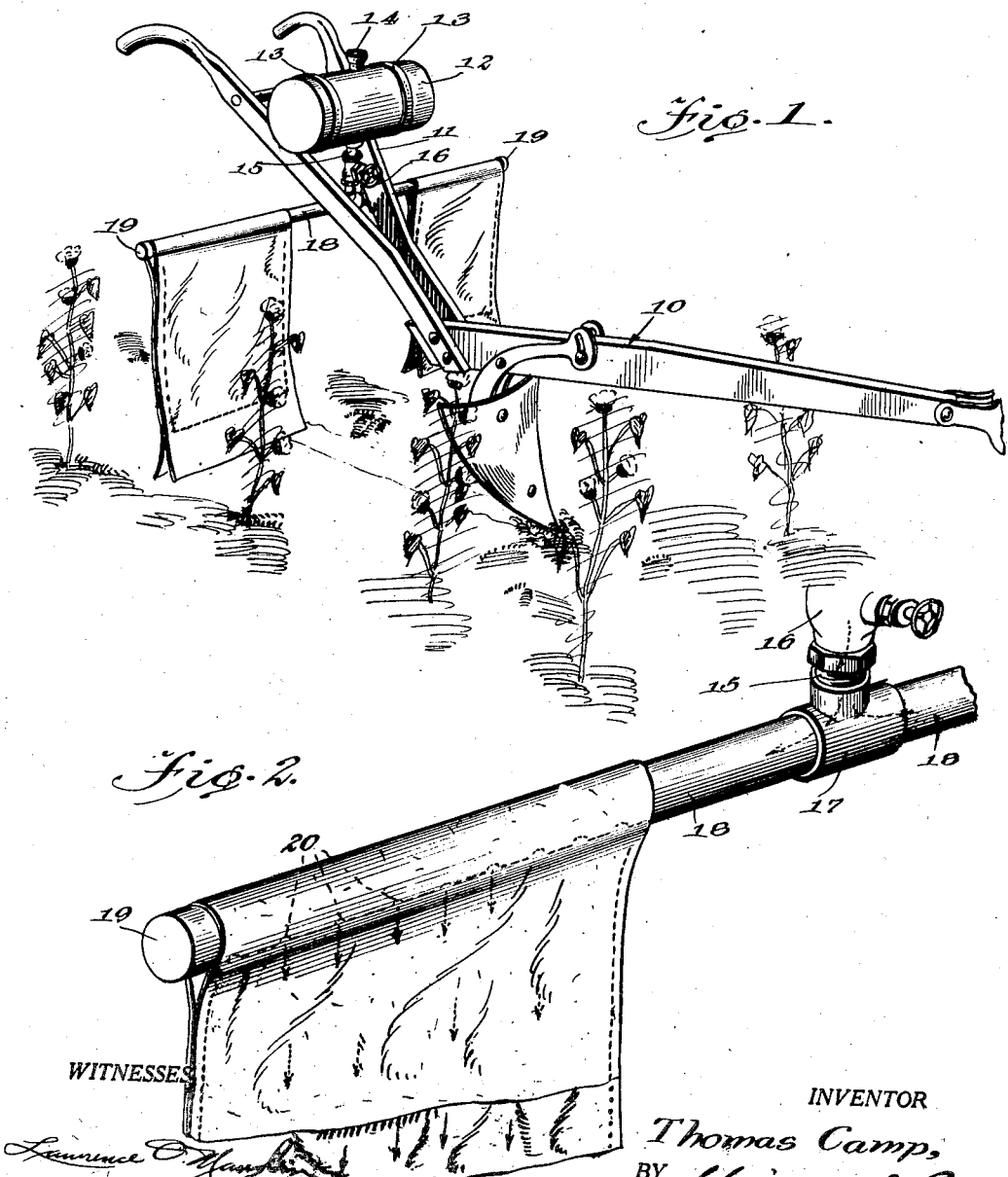

1,527,669

UNITED STATES PATENT OFFICE.

THOMAS CAMP, OF ATLANTA, GEORGIA.

DEVICE FOR APPLYING POISON.

Application filed December 10, 1923. Serial No. 679,695.

*To all whom it may concern:*

Be it known that I, THOMAS CAMP, a citizen of the United States, and a resident of Atlanta, in the county of Fulton and State of Georgia, have invented certain new and useful Improvements in Devices for Applying Poison, of which the following is a specification.

This invention relates to a device for applying poison to vegetation and is particularly adapted for use in treating cotton plants for the purpose of killing the boll weevil.

The object of the invention is to provide a device of this character which is adapted to conveniently effect the proper application of the poison to the cotton plants in an expeditious and practical manner.

A further object is to provide a device of this character and having the foregoing enumerated advantages and capacities and which is at the same time of simple, and durable construction, reliable and effective in operation and easy and comparatively inexpensive to manufacture and operate.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, showing the preferred embodiment of the invention in use;

Figure 2 is a fragmentary perspective view, showing one of the delivery pipes and a portion of the textile receptacle employed for distributing and applying the poison;

Figure 3 is a view in front elevation, showing a cloth receptacle and a portion of the delivery pipe therefor, a portion of one of the flaps employed below the receptacle being broken away;

Figure 4 is a view in vertical section on line 4—4 of Figure 3; and

Figure 5 is a view in horizontal section on line 5—5 of Figure 3.

Referring to the drawings the numeral 10 designates any suitable type of plow or cultivator employed in cotton agriculture. It is to be understood at this point that the plow or cultivator merely constitutes a movable support and that a wheeled or other type of support may be employed in lieu of a plow or cultivator if found desirable. It is believed however that it will usually be considered convenient to apply the poison while cultivating the crops. The plow or cultivator includes a pair of handles 11 and on these handles a supply tank or reservoir 12 is supported and secured. The tank 12 may be secured in any suitable manner on the handles 11 but for the sake of illustration straps 13 are shown encircling the tank 12 and the ends of these straps may be twisted and bolted or otherwise suitably secured to the handles 11. The tank 12 may be filled through a capped filling neck 14. It is to be understood that the tank 12 is filled with a suitable poison solution and usually it is found preferable to employ a mixture of molasses, water and calcium arsenate. An outlet pipe 15 leads from the bottom of the tank 12 and in this outlet pipe 15 a regulating and control valve 16 is incorporated. This valve 16 may be a globe valve, a needle valve or a plug valve of the graduated port type. The particular construction or type of valve employed is not important but it is to be understood that the valve employed should be of such a character as to permit of regulation of the flow through the outlet pipe as well as mere shutting off of the flow. To the lower section of the outlet pipe 15 a T 17 is connected and from the branches of this T rigid delivery pipes 18 extend whereby the delivery pipes 18 communicate with the tank 12 when the valve 16 is open. The outer ends of the delivery pipes are closed by caps 19 and adjacent their outer ends the undersides of the delivery pipes are provided with discharge openings or orifices 20. The delivery pipes 18 may be supported from the tank 12 by the valved outlet pipe but they may be also supported from the handles 11 by means of suitable straps or clamps which embrace the pipes and are secured to the handles 11 by bolts or nuts or any other suitable means. An applying device is mounted on each delivery pipe 18. Preferably these applying devices are of identical construction so that a common description will serve for all. Each comprises a receptacle of textile material, designated generally at 25. In the embodiment shown, the receptacle 25 is made of a single piece of cotton cloth which is doubled upon itself so that the two half sections of the cloth lie in face to face relation. These two half sections are then stitched along their edges, as at 26, and transversely between their side edges, as at 27. The transverse stitching 27 is spaced some distance from the ends of the piece of cotton cloth and in this manner the stitching 27 defines flaps 28 below the bottom of the receptacle. The stitchings 26 extend from the stitching 27 to points adjacent but slightly spaced from the bight or bend of the cloth, designated at 29. By terminating the stitching 26 at a point slightly spaced from the bend or bight 29 of the cloth, openings are left in the sides of the receptacle adjacent the top thereof to permit of the insertion of the delivery pipes 18 or rather of the mounting of the receptacles 25 on these delivery pipes. It will also be understood that the stitchings 26 and 27 provide spaced walls 30 united at their bottom and sides and connected at their tops, these walls thus defining a flat, wide and long receptacle which is flexible and porous. When the receptacles 25 are mounted on the delivery pipes 18 the discharge orifices 20 are disposed within the receptacle and arranged to feed poison flowing through the delivery pipes into the interior of the receptacles. The amount of poison flowing through the delivery pipes is controlled and regulated by the valve 16. The delivery pipes 18 may be detachably connected to the T 16 and if it is desired to use only one delivery pipe and receptacle it is proposed to close the other branch of the T by a suitable plug. The poison which flows into the interior of the receptacle 25 seeps slowly through the walls of the receptacle, and these walls as well as the flaps 28 are soaked with the poison solution. When the cultivator or movable support 10 is pulled between the rows of the plants, the receptacles 25 wet with the poison solution come into contact with the cotton plants and the cotton leaves are turned upward and the liquid applied to the under side of the leaves so that the rain will not wash it off. The receptacles being highly flexible are adapted to pass over the plants while having wiping contact therewith without injuring the plants. At the same time the receptacles have a proper contact with the plants to effect the proper application of the poison solution since the poison solution contained within the receptacles ballast the same to the proper extent.

It will be noted that the flaps 28 assist the outer walls of the receptacle in completely applying the poison to the plants. The bight or bend in the cloth making up each receptacle constitutes an attaching or supporting sleeve adapted to almost completely encircle the delivery pipe on which the receptacle is mounted, as clearly shown in Figure 4.

I claim:

1. A device for applying poison comprising a movable support, a supply tank carried thereby, a valved outlet pipe connected to the tank, rigid delivery pipes connected to the outlet pipe and having discharge orifices and a receptacle of textile material supported upon each delivery pipe and receiving in its interior the poison flowing from the discharge orifices of the delivery pipe, the walls of the receptacle being adapted to have wiping contact with the objects to which the poison is to be applied and permitting the poison to seep slowly through their structure, the poison solution contained in the receptacles serving to ballast the same.

2. A device for applying poison comprising a receptacle constructed of a single piece of cloth doubled upon itself to provide two half sections arranged in face to face relation, a transverse line of stitching uniting the half sections at a point spaced from the ends thereof, lines of stiching extending from the transverse line of stitching to points adjacent the bend of the cloth, the lines of stitching defining the receptacle of tubular form, the transverse line of stitching also defining flaps, and the other lines of stiching defining an attaching sleeve

THOMAS CAMP.